(12) United States Patent
Kim

(10) Patent No.: US 8,995,971 B2
(45) Date of Patent: Mar. 31, 2015

(54) MOBILE COMMUNICATION TERMINAL AND WEB PAGE CONTROL METHOD THEREOF

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1648 days.

(21) Appl. No.: 12/019,571

(22) Filed: Jan. 24, 2008

(65) Prior Publication Data

US 2008/0254778 A1    Oct. 16, 2008

(30) Foreign Application Priority Data

Apr. 11, 2007   (KR) .................. 10-2007-0035617

(51) Int. Cl.
| | | |
|---|---|---|
| H04L 29/06 | (2006.01) | |
| H04M 3/00 | (2006.01) | |
| H04B 1/38 | (2006.01) | |
| G06F 17/24 | (2006.01) | |
| G06F 3/048 | (2013.01) | |
| H04M 1/725 | (2006.01) | |
| G06F 3/0482 | (2013.01) | |

(52) U.S. Cl.
CPC ......... *H04M 1/72561* (2013.01); *G06F 3/0482* (2013.01); *H04M 1/72544* (2013.01); *H04M 1/7258* (2013.01); *H04M 1/72583* (2013.01)
USPC ........ 455/414.3; 455/418; 455/557; 715/208; 715/867

(58) Field of Classification Search
USPC ............... 455/550.1, 186.1, 414.1–414.3, 455/418–420, 557, 566; 715/204–208, 234, 715/243, 273, 700, 867; 709/217–219, 227
See application file for complete search history.

(56) References Cited

U.S. PATENT DOCUMENTS

| | | | | |
|---|---|---|---|---|
| 6,957,398 B1* | 10/2005 | Nayeri | ...................... | 715/867 |
| 2001/0011285 A1* | 8/2001 | Kanno et al. | .................. | 707/512 |
| 2002/0094806 A1* | 7/2002 | Kamimura | .................... | 455/415 |
| 2002/0196269 A1* | 12/2002 | Mo et al. | ....................... | 345/721 |
| 2003/0030679 A1* | 2/2003 | Jain | .............................. | 345/854 |
| 2004/0032434 A1* | 2/2004 | Pinsky et al. | ................ | 345/814 |
| 2004/0116148 A1* | 6/2004 | Ku | ............................. | 455/550.1 |
| 2004/0147280 A1* | 7/2004 | Kamiya | .................... | 455/550.1 |
| 2005/0209923 A1* | 9/2005 | Jablonski et al. | .............. | 705/14 |
| 2005/0210145 A1* | 9/2005 | Kim et al. | .................... | 709/231 |
| 2005/0216526 A1* | 9/2005 | Kumagai | .................... | 707/201 |
| 2005/0268226 A1* | 12/2005 | Lipsky et al. | ................ | 715/515 |
| 2006/0112326 A1* | 5/2006 | Lee et al. | ................... | 715/500.1 |
| 2006/0282500 A1* | 12/2006 | Kiuchi et al. | ................. | 709/203 |
| 2007/0028176 A1* | 2/2007 | Perdomo et al. | ............. | 715/741 |
| 2007/0078903 A1* | 4/2007 | Saito | ............................ | 707/200 |

FOREIGN PATENT DOCUMENTS

KR    10-2002-0082509 A    10/2002

* cited by examiner

*Primary Examiner* — Michael Mapa
(74) *Attorney, Agent, or Firm* — Birch, Stewart, Kolasch & Birch, LLP

(57) ABSTRACT

A method of controlling a mobile communication terminal method includes receiving Internet tag information identifying an Internet address, providing a menu screen on a display of the terminal so that a user can select representative image data that visually represents to the user the Internet address, linking the representative image data selected by the user with the Internet tag information and displaying the representative image data on a display of the mobile communication terminal.

16 Claims, 12 Drawing Sheets

MOBILE COMMUNICATION TERMINAL AND WEB PAGE CONTROL METHOD THEREOF

This application claims priority to Korean Patent Application No. 10-2007-0035617 filed on Apr. 11, 2007 in Korea, the entire contents of which is incorporated herein by reference in its entirety.

BACKGROUND OF THE INVENTION

1. Field of the Invention

The present invention relates to a mobile communication terminal and corresponding web page control method for setting a web page with respect to contents using Internet tag information so that when the web page-set contents are selected, the corresponding web page is accessed.

2. Description of the Related Art

Mobile communication terminals provide many additional functions besides the basic call function. For example, mobile terminals can now connect to the Internet allowing users to view their emails, view news websites, blogs, etc. using their mobile terminal.

Further, the user can save their favorite websites in a bookmark list so a particular website or web page can be immediately accessed later through the bookmark list. However, when the user has a plurality of web pages saved in their favorite list, it is often difficult for the user to remember what the particular web page is. That is, the web pages are saved based on their respective Internet address, thus making it difficult to remember what the particular web page was previously saved and what contents are included in the particular web page.

SUMMARY OF THE INVENTION

Accordingly, on object of the present invention is to address the above-noted and other problems.

Another object of the present invention is to provide a mobile communication terminal and corresponding method allowing a user to associate a particular content such as an image or other data with a web page such that the user can easily remember what the web page corresponds to.

To achieve these and other advantages and in accordance with the purpose of the present invention, as embodied and broadly described herein, the present invention provides in one aspect a method of controlling a mobile communication terminal method includes receiving Internet tag information identifying an Internet address, providing a menu screen on a display of the terminal so that a user can select representative image data that visually represents to the user the Internet address, linking the representative image data selected by the user with the Internet tag information and displaying the representative image data on a display of the mobile communication terminal.

In another aspect, the present invention provides a mobile communication terminal including a wireless communication device configured to access the Internet, a display unit configured to display a menu screen so that a user can input Internet tag information identifying an Internet address and representative image data that visually represents to the user the Internet address and a control unit configured to receive the input Internet tag information and the representative image data, to link the representative image data with the Internet tag information, and to control the display unit to display the representative image data.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Reference will now be made in detail to the preferred embodiments of the present invention, examples of which are illustrated in the accompanying drawings.

Figure 1:
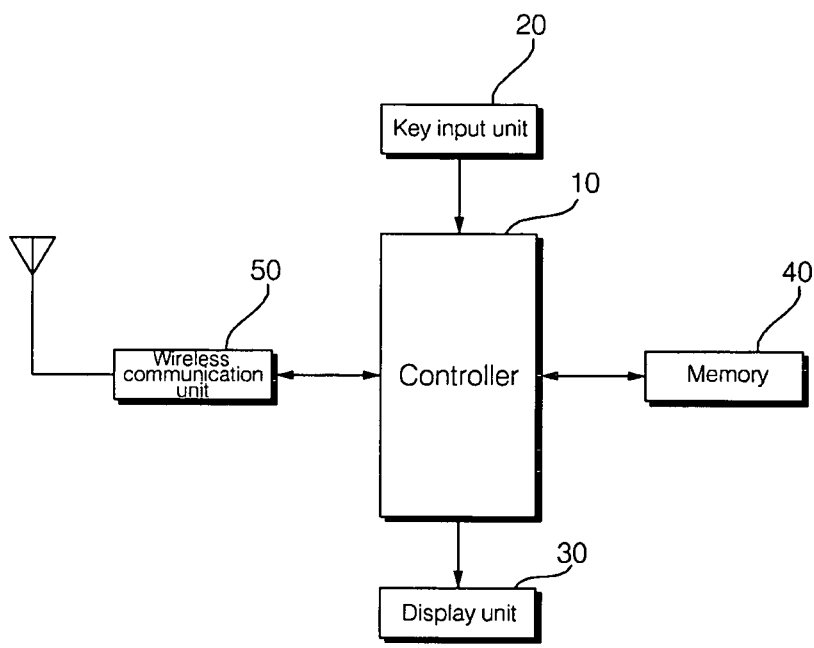
FIG. 1 is a block diagram of a mobile communication terminal according to an embodiment of the present invention.

Turning first to FIG. 1, which is a block diagram of a mobile communication terminal according to an embodiment of the present invention. As shown, the mobile communication terminal includes a wireless communication unit 50 for wireless communicating with other terminals, for accessing the Internet, etc., a memory 40 for storing data, a key input unit 20 including keys, buttons, etc., allowing a user to input information into the terminal, a display unit 30 for displaying information to the user, and a controller 10 for controlling the overall operations of the terminal.

In more detail, the key input unit 20 includes multiple key buttons, etc. that the user may manipulate to perform different functions. That is, when the user manipulates a particular key button(s), a corresponding control signal is sent to the controller 10. The key input unit 20 also includes a hot key that inputs a web access command. That is, a hot key is a key button included in the key input unit 20 that performs a predetermined function when it is manipulated.

In addition, the display unit 30 may be a Liquid Crystal Display (LCD) screen and displays different operational status data of the terminal. The display unit 30 also displays a web page screen image accessed through the wireless communication unit 50. Further, the memory 40 stores data and programs associated with the terminal. For example, the memory 40 stores software programs for controlling the overall operations of the terminal, data input by a user, data downloaded from an external server, etc. The memory 40 also stores a bookmark list including web page information accessed through the wireless communication unit 50.

In addition, the controller 10 registers the Internet bookmark list for a web connection, and when one of bookmarked items is selected from the registered bookmark list, the controller 10 accesses a corresponding web page according to Internet tag information registered in the selected bookmarked item. In more detail, the Internet tag information includes the website information such as a website name and a website address, etc. Thus, the controller 10 accesses a particular web page using the input Internet tag information.

Further, the web page is set with respect to a particular content. That is, the content for the particular web page may be an image, video, flash and text, etc. Meanwhile, when the contents stored in the memory 40 are retrieved, the controller 10 may register additionally inputted Internet tag information with respect to the selected contents to thus set the web page with respect to the selected contents.

That is, the controller 10 stores the web page information set based on the inputted tag information and the selected data in a separate region of the memory 40 storing the bookmark list and sets the web page information to be linked with the selected contents. Thus, when the bookmark list is retrieved, the controller 10 displays at least one web page list set based on the input Internet tag information and contents. For example, the controller 10 can display the bookmark list in the form of a list or thumbnails. When the bookmark list is displayed in the thumbnail form, the controller 10 displays an image of contents set in the web page of the bookmark list. If no contents have been set in the web page, the controller may exclude it from the thumbnails or display it in the form of a text image. The controller 10 may also display a separate icon for discriminating the contents-set web page.

Figure 2:
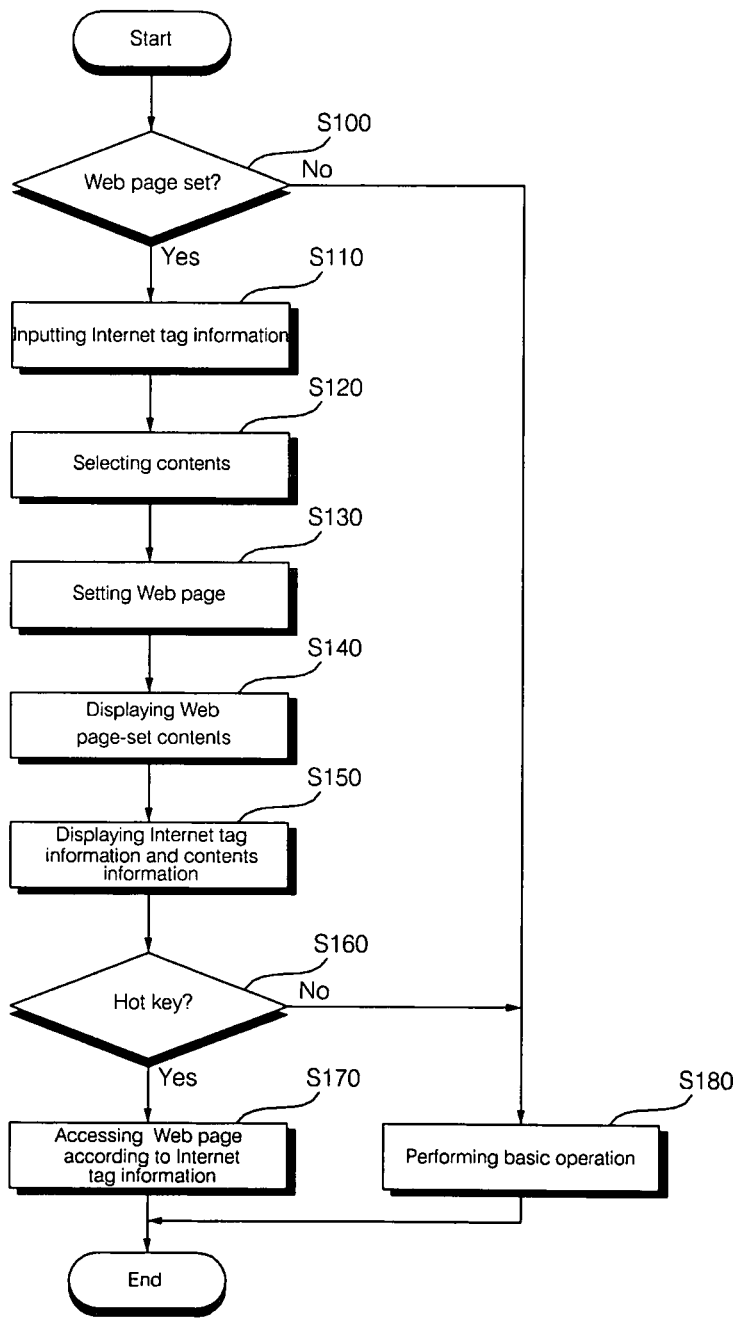
FIG. 2 is a flowchart illustrating a web page control method of a mobile communication terminal according to a first embodiment of the present invention.

Turning next to FIG. 2, which is a flowchart illustrating a web page control method of a mobile communication terminal according to a first embodiment of the present invention. FIG. 1 will also be referred to in this description. As shown in FIG. 2, the controller 10 determines if a web page is set in an Internet bookmark menu (S100). When the controller 10 determines a web page has been set (Yes in S100), the controller 10 displays a menu on the display unit prompting the user to input Internet tag information including the name and an address of a website, etc. (S110). The menu also includes a field allowing the user to select a particular content stored in the memory 40 to be associated with the particular set web page (S120). The controller 10 then sets the web page based on the input Internet tag information and selected contents (S130).

The controller 10 then displays the selected contents for the set web page is on a screen of the mobile communication terminal (S140), and then the Internet tag information set for the web page and contents information such as a contents type and the name of the contents are also displayed (S150). The Internet tag information and the contents information can be displayed together on the screen or can be alternately displayed on the screen at certain time intervals.

In addition, the controller 10 then determines if a pre-set hot key is manipulated in a state that the web page-set contents are displayed on the screen or if a web access command is applied according to a provided menu operation (S160). If a preset-hot hot key is manipulated or a web access command is input (Yes in S160), the controller 10 accesses a corresponding web page according to the Internet tag information linked to the displayed data (S170). If no web access command is applied (No in S160), a basic operation is performed according to a control signal corresponding to a manipulated key (S180).

Figure 3:
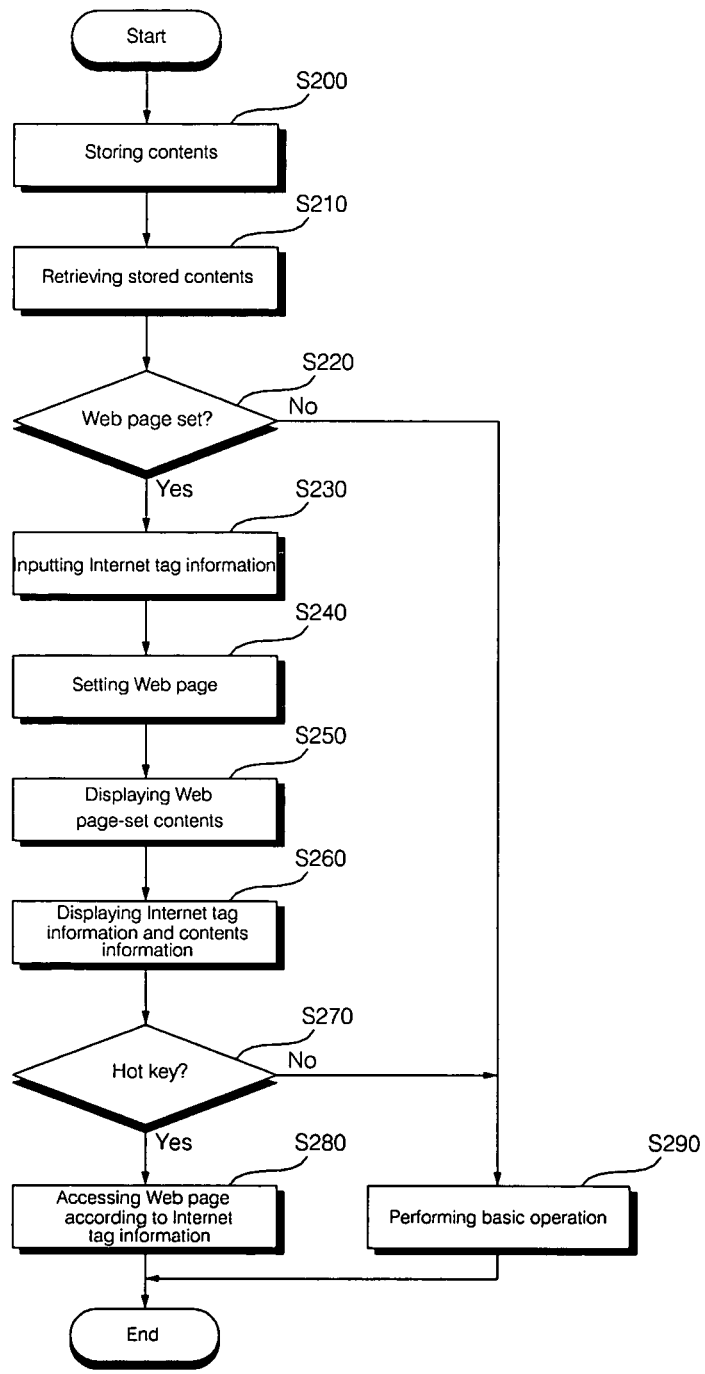
FIG. 3 is a flowchart illustrating a web page control method of a mobile communication terminal according to a second embodiment of the present invention.

Next, FIG. 3 is a flowchart illustrating a web page control method of a mobile communication terminal according to a second embodiment of the present invention. FIG. 1 will also be referred to in this description. With reference to FIG. 3, the controller 10 first stores contents in the memory 40 (S200). Then, the controller 10 retrieves the contents stored in the memory 40 (S210) when a command is input to retrieve the contents. The controller 10 then determines if a web page has been set (S220).

When the web page has been set (Yes in S220), the controller 10 sets the web page with respect to the selected contents using input Internet tag information such as an input name and an address of a website, etc. corresponding to the set web page (S230 and S240). Further, the information on the web page set for the contents (including the Internet tag information) is preferably separately stored in a region of the memory 40 storing an Internet bookmark list and is set to be linked with the contents.

After the web page is set, the controller 10 displays the web page-set contents on the display unit 30 (S250), and also displays information of the displayed contents and the Internet tag information linked thereto (S260). Then, the controller 10 determines if a pre-set hot key is manipulated or if a web access command is input according to a provided menu operation (S270).

When a pre-set key or command has been input (Yes in S270), the controller 10 accesses the web page according to the Internet tag information linked to the contents (S280). Meanwhile, when no web access command is input (No in S270), a basic operation is performed according to a control signal corresponding to a manipulated key (S290).

Figure 4:
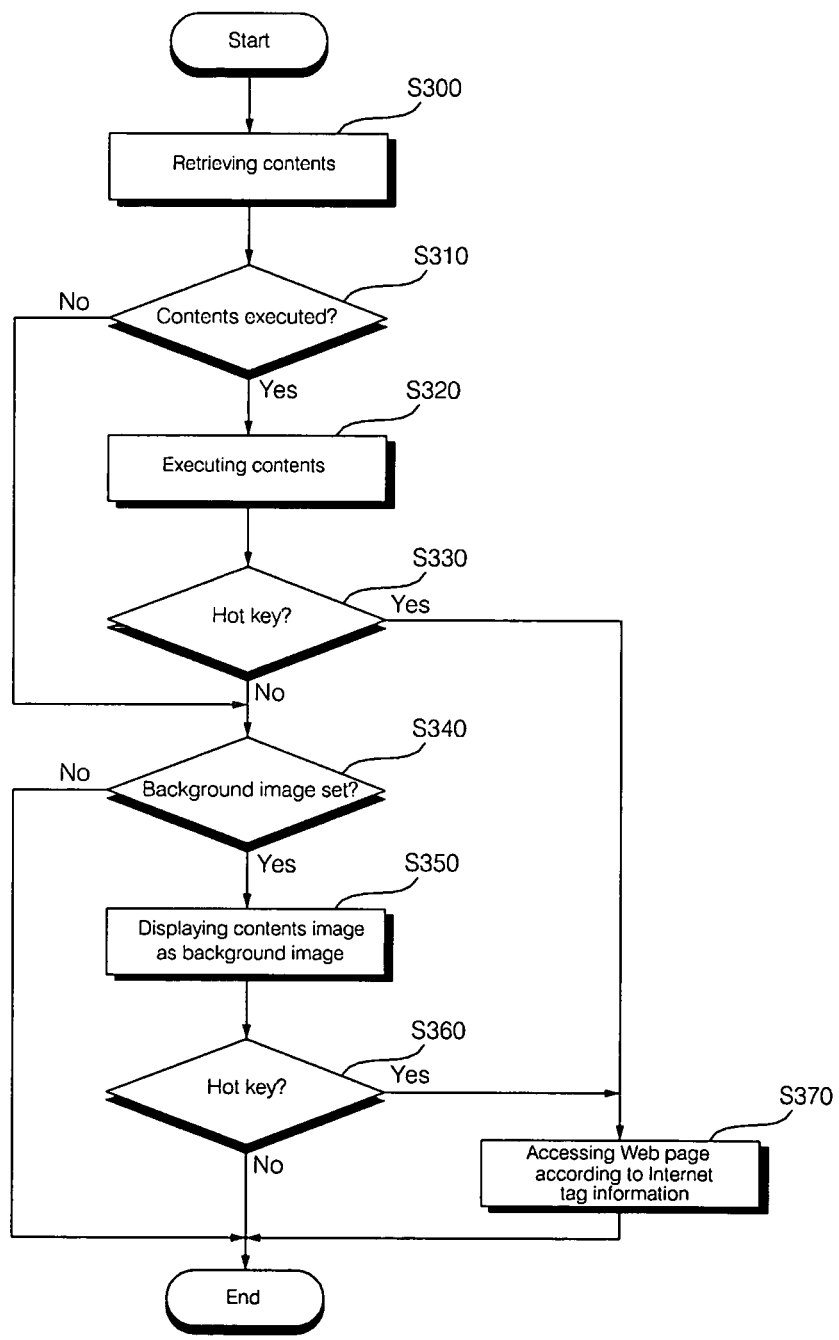
FIG. 4 is a flowchart illustrating a web page control method of a mobile communication terminal according to a third embodiment of the present invention.

Turning next to FIG. 4, which is a flowchart illustrating a web page control method of a mobile communication terminal according to a third embodiment of the present invention. FIG. 1 will also be referred to in this description. With reference to FIG. 4, the controller 10 first retrieves contents stored in the memory 40 (S300). Next, the controller 10 determines if a command for executing the selected contents is input (S310). When the command has been input (Yes in S310), the controller 10 executes the selected contents (S320).

The controller 10 then determines if a web access command is input according to manipulation of a pre-set hot key while the contents are being executed (S330). When the web access command has been input (e.g., a hot key has been manipulated) (Yes in S330), a corresponding web page is accessed according to Internet tag information linked to the contents being executed (S370). If the web access command has not been input (No in S330), the controller 10 determines whether or not the user wants to set the web page-set contents as a background image (S340).

If the user wants to set the contents as a background image (Yes in S340), the controller 10 sets and displays the selected contents as a background image on the display unit 10 (S350). That is, when the mobile terminal is in a standby state, the contents are displayed as the background image. Further, the controller 10 again determines if a web access command is applied according to manipulation of the pre-set hot key (S360). If the web access command has been input (Yes in S360), the controller 10 accesses a corresponding web page according to the Internet tag information linked to the contents (S370).

In addition, when the user selects two or more contents from the web page-set contents to be background images, the controller 10 sets and displays the selected multiple contents images on the background screen. For example, the controller 10 can display the background images in a sequential manner, at certain time intervals, etc. Further, when the user manipulates a hot key when the contents are displayed on the display unit 30, the controller 10 accesses a corresponding web page according to the linked Internet tag information.

Further, the controller 10 displays the information of the contents on the background screen and the Internet tag information linked thereto together to allow the user to easily recognize the information of the web page set for the contents. The controller 10 may also display an icon for informing the user that the contents are web page-set contents to allow the user to easily recognize the web page-set contents.

Also, when a contents image, for which no web page is set, is set as a background screen image it is possible to display the web page-set image when the hot key is manipulated. In addition, as discussed above, the hot key is a pre-set web access key. Rather than using the hot-key, the user can also access a web page via a separately provided menu operation.

Figure 5:
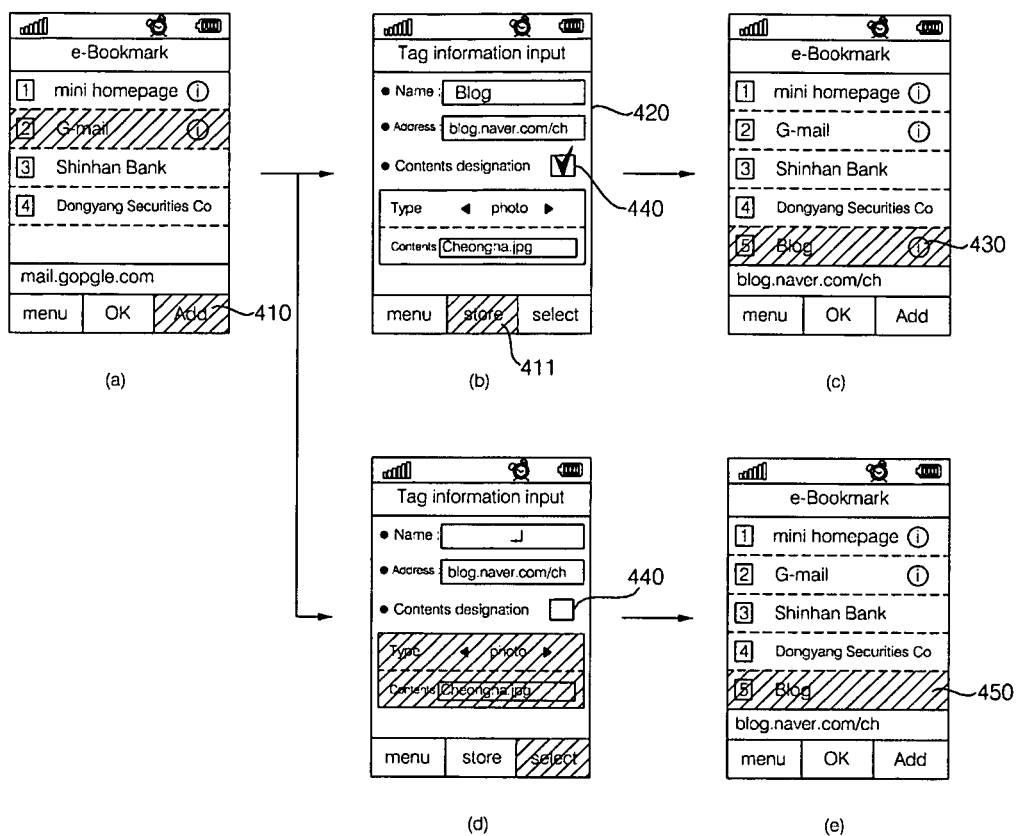
FIG. 5 is an overview illustrating display screens for linking contents with a web page according to the first embodiment of the present invention.

Next, FIG. 5 is an overview of display screens on a mobile communication terminal according to the first embodiment of the present invention. FIG. 1 will also be referred to in this description. In more detail, as shown in FIG. 5(a), when an internet bookmark menu is executed, the controller 10 displays web page information registered in the bookmark list on the display unit 30. When one of web pages registered in the bookmark list is selected, the controller 10 displays corresponding Internet tag information and contents information on the display unit 30.

Further, as shown in FIG. 5(a), the display screen also includes a 'menu button,' an 'OK' button and an 'Add' button 410. In more detail, when the 'Add' button 410 for setting a new web page is selected, the controller 10 displays a web page set image 420 as shown in FIG. 5(b). In this instance, Internet tag information such as 'Name: Blog, Address: blog.naver.com/ch' etc. is shown in an input window. In addition, one of the contents stored in the memory 40 such as the 'Cheongha.jpg' content can be selected (see FIG. 5(b)). That is, the user selects the 'contents designation' field 440 and then selects a particular content to be associated with the web page.

As shown in FIG. 5(b), the display screen also includes a 'store' button 411. Thus, the user can select the 'store' button 411 to link the selected contents with the input web page. That is, as shown in FIG. 5(c), when the user selects the 'store' button 411 in FIG. 5(b), the controller 10 displays the set web page by adding an item '5. Blog' to the bookmark list. In addition, the controller 10 also displays an icon 430 for informing the user that the contents corresponding to the web page have been set.

Further, as shown in FIG. 5(d), when the user does not select any contents (i.e., does not check the contents field 440), only an item '5. Blog' 450 is displayed on the bookmark list as shown in FIG. 5(e). That is, as shown in FIG. 5(e), the icon 430 as in FIG. 5(c) is not displayed, thereby informing the user the web page is not associated with any contents.

Figure 6:
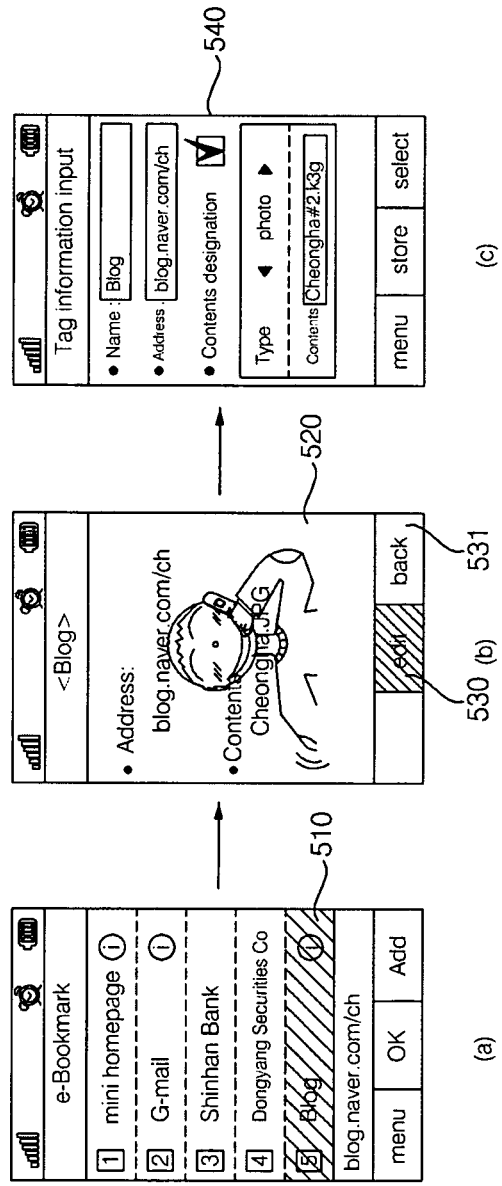
FIG. 6 is an overview illustrating display screens for selecting a web page including linked contents according to the first embodiment of the present invention.

Next, FIG. 6 is an overview illustrating display screens displaying data information and Internet tag information set in the web page. In more detail, as shown in FIG. 6, when the bookmark list is retrieved as shown in FIG. 6(a) and a contents-registered web page is selected (i.e., the web page includes an icon 510 indicating the web page is associated with contents) the controller 10 displays Internet tag information and contents information as shown in FIG. 6(b). Further, the registered contents image 520 is also displayed as a background image.

In addition, as shown in FIG. 6(b), the display screen also includes an 'edit' button 530 and a 'back' button 531. In more detail, when the user selects the 'edit' button 530, the Internet tag information and contents information registered in the web page can be edited using the display screen shown in FIG. 6(c). The user can select the 'back button' to return to the previous display screen.

Figure 7:
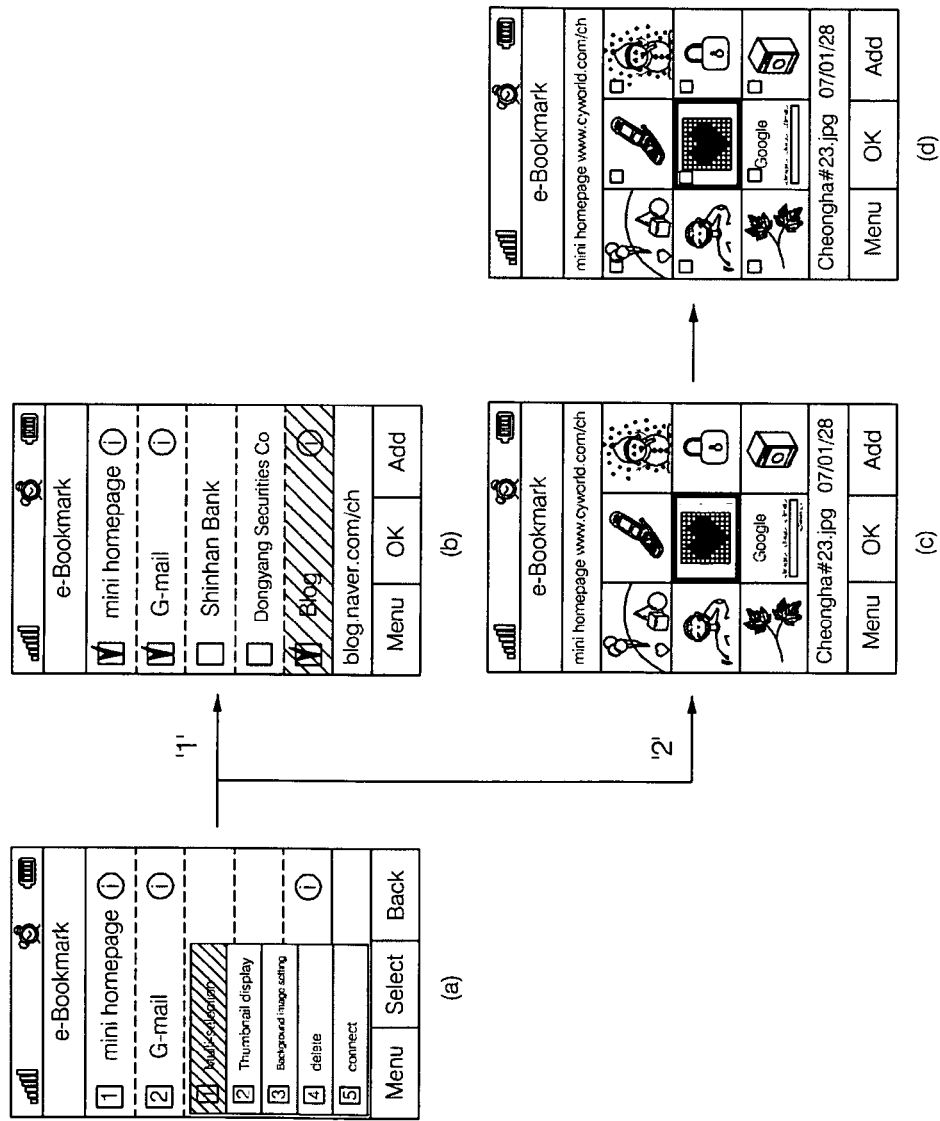
FIG. 7 is an overview illustrating display screens for displaying set information about particular web pages and for displaying web pages in a thumbnail manner corresponding to the linked contents according to the first embodiment of the present invention.

Turning now to FIG. 7, which is an overview illustrating display screens including web page information registered in the bookmark list. In more detail, as shown in FIG. 7(a), the controller 10 retrieves and displays the bookmark list. Then, the user can select a 'menu' button 701 to display a pre-set menu. When the user selects the item '1. multi-selection' in the pre-set menu shown in FIG. 7(a), the selection mode for each web page is displayed as shown in FIG. 7(b).

Further, one of the contents including in the list can be displayed as a background screen image by selecting the 'item 3. Background image setting' in the menu shown in FIG. 7(a). The user can also delete web pages in the bookmark list by selecting the 'item 4. delete' in the menu. Similarly, the user can connect to a web page using the 'item 5. connect' in the menu.

In addition, as shown in FIG. 7(a), the menu also includes an item '2, Thumbnail display.' In more detail, when the user selects this item, the controller 10 displays the web pages in a thumbnail format as shown in FIG. 7(c). That is, the contents images registered in the web page of the bookmark list are displayed as the thumbnail images. Further, if no contents have been registered, characters such as 'no image' can be displayed.

In addition, in FIG. 7(c), because the thumbnail images of the contents-registered web page are displayed, the controller 10 does not display an additional icon. However, it is also possible to display an icon according to a user setting. Also, the Internet tag information and contents information registered in a selected web page can be displayed together at a lower end portion of the screen (see FIG. 7(c)).

Here, when the user selects the 'menu' button 701 in FIG. 7(c) and selects the 'multi-selection' mode, each item can be selected as shown in FIG. 7(d), and at least one selected image can be registered as a background image.

Figure 8:
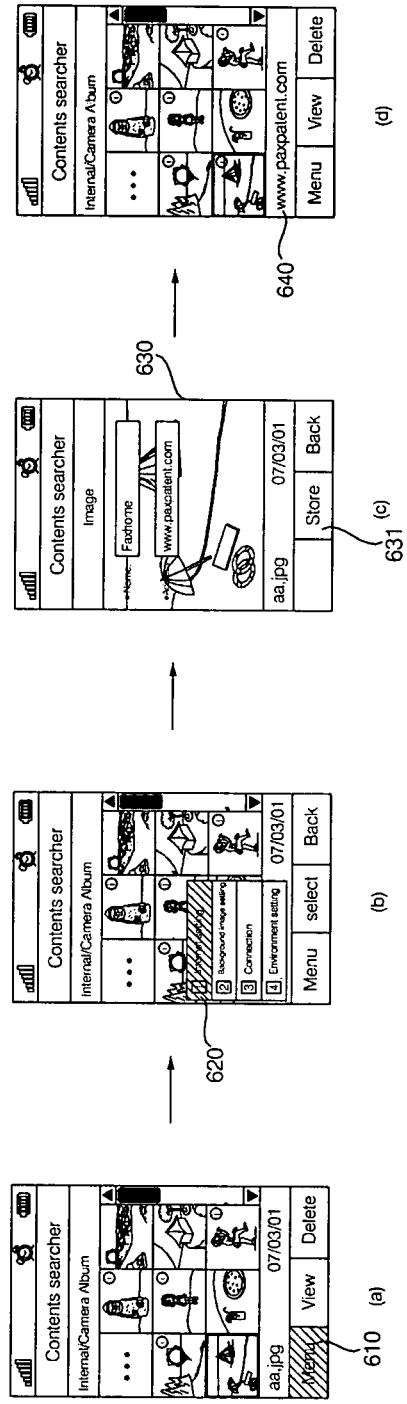
FIG. 8 is an overview illustrating display screen of operations of the mobile communication terminal according to the second embodiment of the present invention.

Next, FIG. 8 is an overview illustrating display screens on the mobile communication terminal according to the second embodiment of the present invention. This embodiment differs from the first embodiment, because a web page is set for contents selected in a state that contents stored in the memory 40 are retrieved.

In more detail, and as shown in FIG. 8(a), the controller 10 retrieves contents stored in the memory 40 and displays the retrieved contents list on the display unit 30. Further, as shown, the display screen includes a 'menu' button 610. Therefore, when the contents 'aa.jpg' is selected from the retrieved contents list and the user selects the 'menu' button, 610, the controller 10 displays a menu item list as shown in FIG. 8(b).

Also, when the user selects an 'Internet setting' item 620 with respected to the contents 'aa.jpg', the controller 10 displays a web page set screen 630 on the display unit 30 as shown in FIG. 8(c). As shown, Internet tag information such as 'Name: Paxhome, Address: www.paxpatent.com' is input using key buttons provided in the key input unit 20.

Further, the display screen 630 in FIG. 8(c) also includes a 'store' button 631 allowing the user to store the input Internet tag information and corresponding contents. That is, the controller 10 sets a web page by using the input Internet tag information 'Name: Paxhome, Address: www.paxpatent.com' and the contents 'aa.jpg' in a certain region of the memory 40. The contents and Internet tag information is also linked together.

Thus, when the web page-set contents are selected from the contents list, the Internet tag information 'www.paxpatent.com' linked to the selected contents 'aa.jpg' is displayed at the lower end portion 640 of the screen as shown in FIG. 7(d). Further, the Internet tag information can be alternately displayed with the contents information 'aa.jpg Jul. 3, 2001' at certain time intervals. In addition, when the contents are displayed on the screen, an icon for confirming that the contents are web page-set contents is also displayed.

Figure 9:
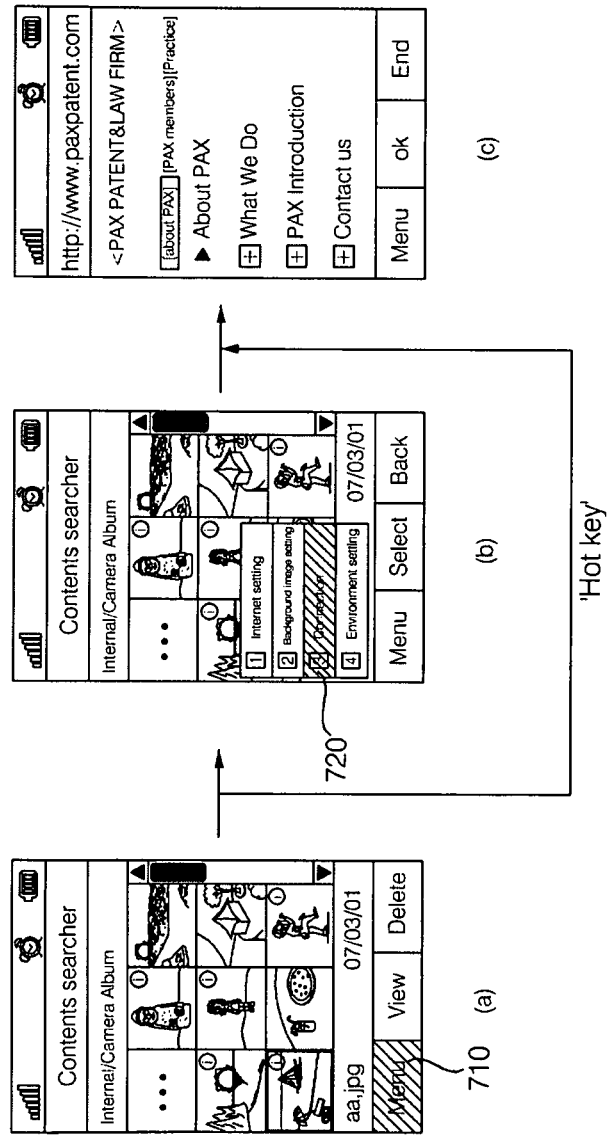
FIG. 9 is an overview illustrating display screens including contents being display in a thumbnail manner in the mobile communication terminal according to the third embodiment of the present invention.

Turning next to FIGS. 9 to 12, which are overviews illustrating display screens of the mobile communication terminal according to the third embodiment of the present invention. FIG. 1 will also be referred to in this description. In more detail, FIG. 9 is an overview illustrating an operation of immediately accessing a web page in a state that a contents list is displayed. That is, FIG. 9(a) illustrates a display screen including retrieved contents being displayed in a thumbnail manner. When the user selects a 'menu' button 710 for the selected contents 'aa.jpg', the controller 10 displays a menu item list as shown in FIG. 9(b).

Further, when the user selects a 'connection' item 720 or manipulates a pre-set hot key, the controller 10 detects the Internet tag information linked to the selected contents 'aa.jpg'. The controller 10 then automatically access the corresponding web page 'www.paxpatent.com' according to the Internet tag information linked to the selected contents 'aa.jpg' as shown in FIG. 9(c).

Figure 10:
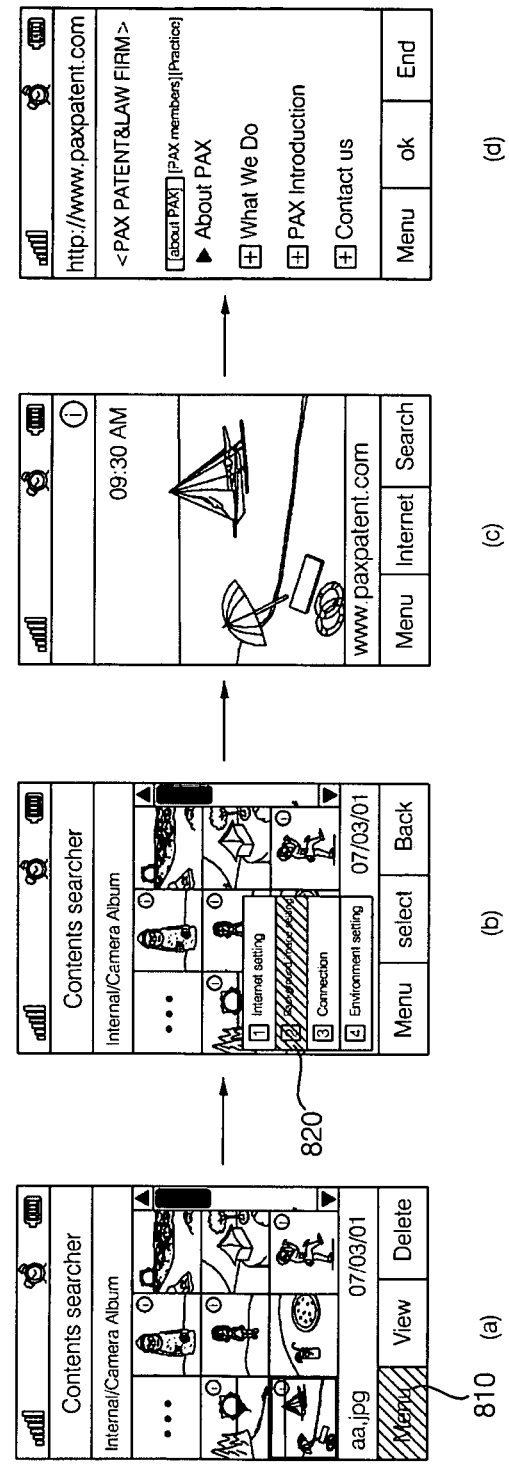
FIG. 10 is another overview illustrating other display screens including contents being display in a thumbnail manner in the mobile communication terminal according to the third embodiment of the present invention.
Figure 11:
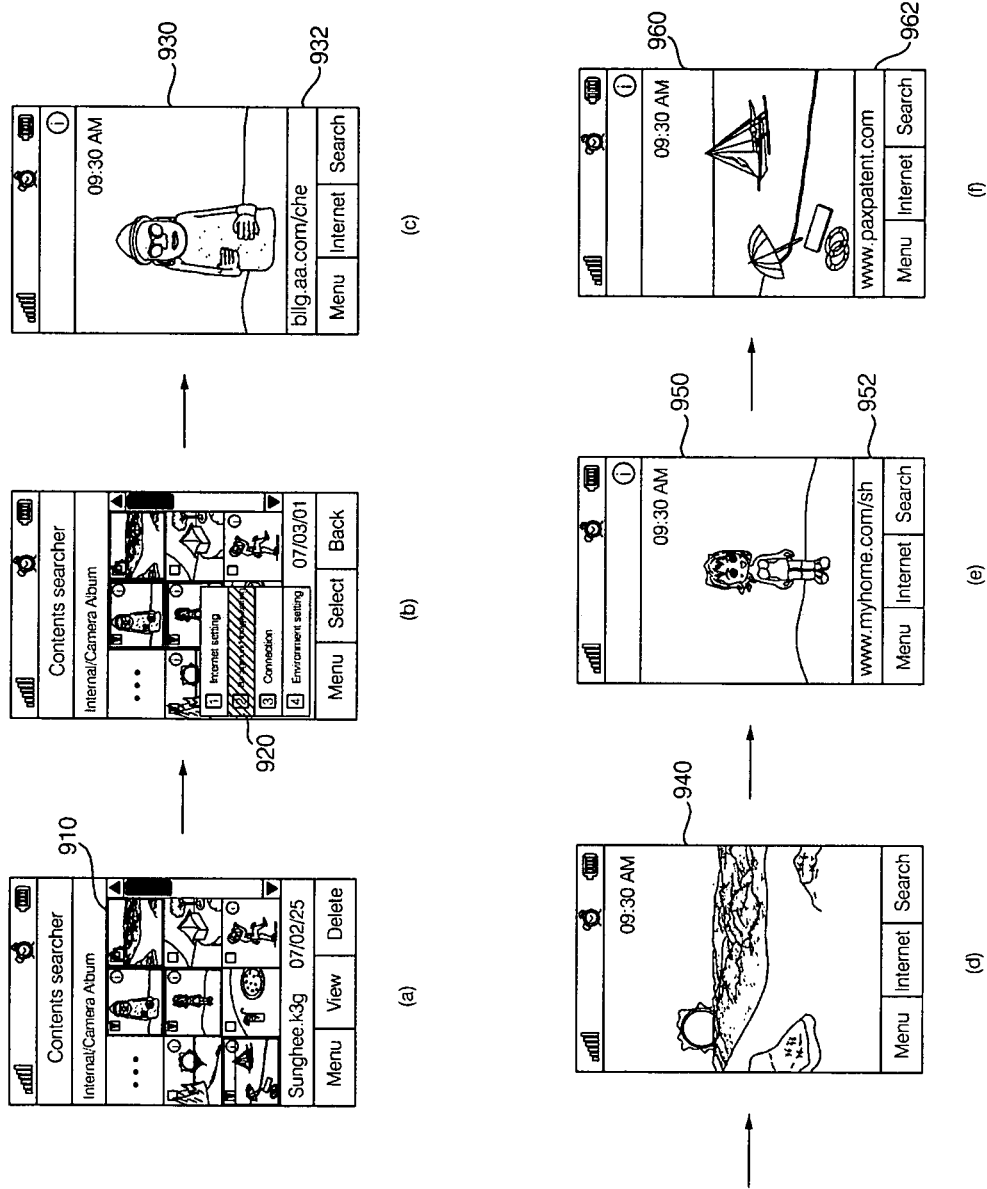
FIG. 11 is an overview illustrating still other display screens including contents being display in a thumbnail manner in the mobile communication terminal according to the third embodiment of the present invention.

Next, FIGS. 10 and 11 are overviews illustrating operations of accessing a web when web page-set contents are registered as a background image. In more detail, as shown in FIG. 10(a), the controller 10 first retrieves contents stored in the memory 40 and displays the contents list on the display unit 30. Then, when the user selects a 'menu' button 810 with respect to the selected contents 'aa.jpg', the controller 10 displays a menu item list as shown in FIG. 10(b).

When the user selects a 'background image setting' item 820, the controller 10 sets an image of the selected contents 'aa.jpg' as a background screen image. The controller 10 then displays the image of the contents 'aa.jpg' on the display unit 40 in a standby mode as shown in FIG. 10(c). Further, information about the contents 'aa.jpg' and Internet tag information linked thereto are also displayed on the display unit 40.

In addition, as shown in the upper portion of the display screen in FIG. 10(c), the controller 10 also displays an icon for confirming that the web page has been set for the contents 'aa.jpg'. In addition, When a web access command is input in the state that the image of the contents 'aa.jpg' is displayed as the background screen image, the controller 10 detects the Internet tag information linked to the contents 'aa.jpg' and automatically accesses the corresponding 'www.paxpatent.com' web page as shown in FIG. 10(d).

Next, FIG. 11 is an overview illustrating an operation for setting selected multiple contents as background images, unlike the case of FIG. 10 in which only one selected contents item is set as the background image. In more detail, and with reference to FIG. 11, when four contents are selected from a multi-selection mode screen image 910 as shown in FIG. 11(a) and a 'background image setting' item 920 is selected using the menu button as shown in FIG. 11(b), the controller 10 registers the four selected contents images as background images.

Further, the four registered contents images are alternately displayed on a standby screen at certain intervals. Namely, the controller 10 displays the first contents image 930 as shown in FIG. 11(c) as the background image, and when a certain time lapses, the controller 10 displays the next contents image 940 as shown in FIG. 11(d) as a background image. Similarly, when a certain time lapses, the controller displays the next contents image 950 as shown in FIG. 11(e) as a background image, and thereafter, when a certain time lapses, the controller 10 displays the next contents image 960 as shown in FIG. 11(f) as a background image.

Further, as shown in FIGS. 11(c), 11(e), and 11(f), the controller 10 also displays corresponding icons to indicate to the user they are linked with a web page. In addition, after a certain time lapses with respect to the contents image 960 as shown in FIG. 11(f), the controller 10 repeats displaying the contents images starting from the contents image as shown in FIG. 11(c). Also, when the web page-set contents as displayed as in FIGS. 11(c), 11(e), and 11(f) including icons are output, the controller 10 displays the contents information and the Internet tag information linked thereto '932', '952', and '952' at the lower end portions of the display screen. Further, when a content image without any web page is set as the background image, the controller 10 displays only the contents image on the screen as shown in FIG. 11(d).

In addition, when the hot key is manipulated in one of the screens displaying the content images as shown in FIGS. 11(c), 11(e), and 11(f), likewise as in FIG. 10, the controller 10 automatically accesses a corresponding web page according to the Internet tag information linked to the displayed contents.

Figure 12:
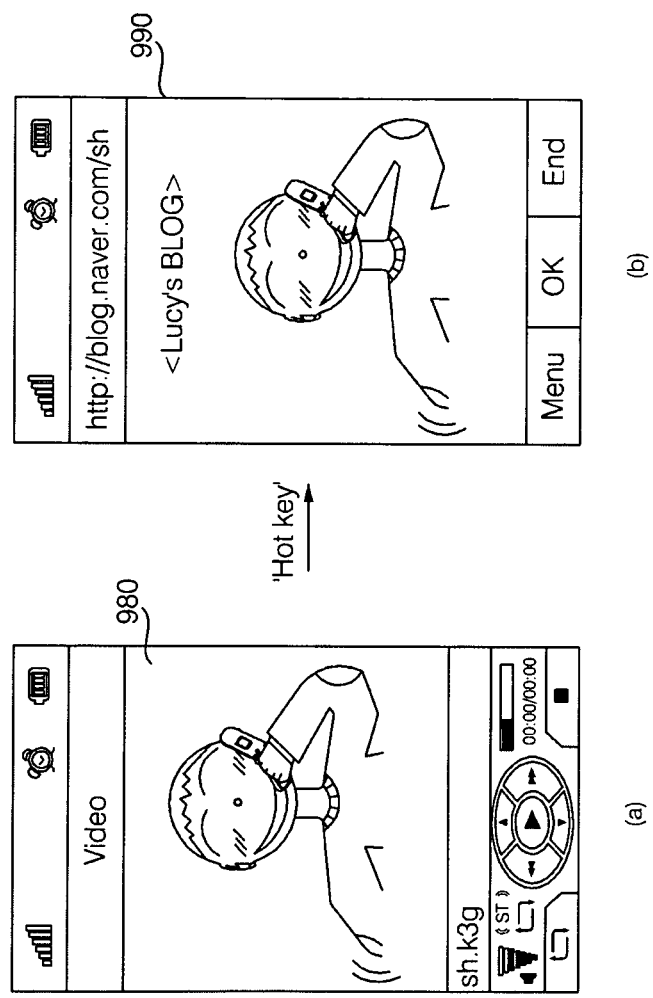
FIG. 12 is an overview illustrating display screens including contents being currently displayed and a hot key being selected in the mobile communication terminal according to the third embodiment of the present invention.

Next, FIG. 12 is an overview of display screen when an operation of accessing a web while contents is executed. FIG. 1 will also be referred to in this description. In more detail, when a hot key is manipulated while web page-set contents 'sh.k3g' 980 among contents stored in the memory 40 is being reproduced as shown in FIG. 12(a), the controller 10 detects Internet tag information linked to the video contents 'sh.k3g' being reproduced.

Then, the controller 10 automatically accesses a web page 'blog.naver.com/sh' corresponding to the detected Internet tag information as shown in FIG. 12(b) and displays the accessed screen image 990 of the 'blog.naver.com/sh'. Further, when reproducing video contents, the controller 10 displays the contents information and its linked Internet tag information together for a user's easy recognition. Also, the controller 10 displays an icon confirming that the contents have the set web page.

Further, it is also possible for the user to transmit the displayed representative image (contents) to another mobile terminal via the wireless communication unit 50 such that a user of the another mobile terminal can access the Internet address included in the Internet tag information by selecting the representative image data. In addition, the representative image data (contents) can be displayed as a background transparent image with the Internet tag information being displayed in the foreground, or vice-versa.

In the above-described embodiments of the present invention, the web page is set for particular contents using input Internet tag information. Further, the contents can be an image or any other type of data.

As described above, the present invention includes several advantages. For example, by setting a web page with respect to particular contents using the Internet tag information, when the web page-set contents are selected, the corresponding web page can be accessed according the tag information linked thereto. Therefore, the user convenience is increased and the time for searching a desired website following a web connection is shortened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile communication terminal, the method comprising:
    retrieving and displaying on a display unit of the mobile communication terminal a plurality of image data stored in a memory of the mobile terminal;
    receiving a selection signal indicating a selection of a representative image data among the plurality of stored image data that is to be linked with Internet tag information including at least an Internet address;
    displaying a menu screen on the display unit that includes an option for entering the Internet address to be linked with the selected representative image data, the menu screen comprising an internet setting item and a wallpaper setting item;
    linking the selected representative image data with the Internet tag information in response to a first user input selecting the internet setting item of the menu screen;
    displaying the selected representative image data on the display unit together with the Internet tag information, wherein displaying the selected representative image data comprises displaying, as thumbnail images, a plurality of representative image data previously linked with a corresponding plurality of Internet tag information;
    selecting at least two thumbnail images from the displayed thumbnail images in response to a user selection command, and re-displaying the menu screen on the display unit after selecting the at least two thumbnail images;
    registering each of the selected thumbnail images as a wallpaper image on the display unit in a standby state in response to a second user input selecting the wallpaper setting item of the menu screen;
    alternately displaying the registered thumbnail images as the wallpaper image on a standby screen at certain intervals in a cycling manner, the alternately displayed wallpaper image comprising an icon indicating that a corresponding representative image data is linked with the Internet tag information; and
    if a web access command is received when one of the registered thumbnail images is displayed as the wallpaper image, accessing a webpage based on the Internet tag information linked to the displayed thumbnail image,
    wherein the selected representative image data that is to be linked with the Internet tag information is independent and separate from a webpage corresponding to the Internet address included in the Internet tag information.

2. The method of claim 1, wherein the displayed representative image data includes one of an image and a video.

3. The method of claim 1, wherein the Internet tag information and content information of the representative image data are alternately displayed such that the representative image data is first displayed and the Internet tag information is not displayed, and then the Internet tag information is displayed and the representative image data is not displayed in a cycling manner.

4. The method of claim 1, further comprising:
    transmitting the displayed representative image data including the icon and the Internet tag information to another mobile terminal such that a user of the another mobile terminal can access the Internet address included in the Internet tag information by selecting the representative image data.

5. The method of claim 1, wherein the representative image data is displayed as a background transparent image with the Internet tag information being displayed in the foreground.

6. The method of claim 1, wherein the Internet tag information further includes a corresponding name of a website corresponding to the Internet address.

7. The method of claim 1, wherein the plurality of image data stored in the memory of the mobile terminal correspond to personal images saved by a user of the mobile terminal.

8. The method of claim 1, wherein the personal images are saved in a Camera album folder in the memory.

9. A mobile communication terminal, comprising:
    a wireless communication device configured to access the Internet;
    a control unit configured to retrieve a plurality of image data stored in a memory of the mobile communication terminal;
    a display unit configured to display the retrieved plurality of image data; and
    an input unit configured to receive a selection signal indicating a selection of a representative image data among the plurality of stored image data that is to be linked with Internet tag information including at least an Internet address;
    wherein the control unit is further configured to:
        display, on the display unit, a menu screen that includes an option for entering the Internet address to be linked with the selected representative image data, the menu screen comprising an internet setting item and a wallpaper setting item;
        link the selected representative image data with the Internet tag information in response to a first user input selecting the internet setting item of the menu screen;
        display the selected representative image data on the display unit together with the Internet tag information, wherein the control unit is further configured to display, as thumbnail images, a plurality of representative image data previously linked with a corresponding plurality of Internet tag information;
        select at least two thumbnail images from the displayed thumbnail images in response to a user selection command, and re-display the menu screen on the display unit after selecting the at least two thumbnail images;

register each of the selected thumbnail images as a wallpaper image on the display unit in a standby state, in response to a second user input selecting the wallpaper setting item of the menu screen;

alternately display the registered thumbnail images as the wallpaper image on a standby screen at certain intervals in a cycling manner, the alternately displayed wallpaper image comprising an icon indicating that a corresponding representative image data is linked with the Internet tag information; and if a web access command is received when one of the registered thumbnail images is displayed as the wallpaper image, access a webpage based on the Internet tag information linked to the displayed thumbnail image, wherein the selected representative image data that is to be linked with the Internet tag information is independent and separate from a webpage corresponding to the Internet address included in the Internet tag information.

10. The mobile communication terminal of claim 9, wherein the displayed representative image data includes one of an image and a video.

11. The mobile communication terminal of claim 9, wherein the control unit controls the display unit to alternately display the Internet tag information and content information of the representative image data such that the representative image data is first displayed and the Internet tag information is not displayed, and then the Internet tag information is displayed and the representative image data is not displayed in a cycling manner.

12. The mobile communication terminal of claim 9, wherein the control unit controls the wireless communication unit to transmit the displayed representative image data including the icon and the Internet tag information to another mobile terminal such that a user of the another mobile terminal can access the Internet address included in the Internet tag information by selecting the representative image data.

13. The mobile communication terminal of claim 9, wherein the control unit controls the display unit to display the representative image data as a background transparent image with the Internet tag information being displayed in the foreground.

14. The mobile communication terminal of claim 9, wherein the Internet tag information further includes a corresponding name of a website corresponding to the Internet address.

15. The mobile communication terminal of claim 9, wherein the plurality of image data stored in the memory of the mobile terminal correspond to personal images saved by a user of the mobile terminal.

16. The mobile communication terminal of claim 9, wherein the personal images are saved in a Camera album folder in the memory.

\* \* \* \* \*